United States Patent
Papanu et al.

[11] Patent Number: 6,120,908
[45] Date of Patent: Sep. 19, 2000

[54] STRENGTHENING FLAT GLASS BY EDGE COATING

[75] Inventors: Victor D. Papanu, Doylestown; Stephen W. Carson, Downingtown, both of Pa.; Scott J. Schwartz, East Brunswick, N.J.

[73] Assignee: Elf Atochem North America, Inc., Philadelphia, Pa.

[21] Appl. No.: 09/143,952

[22] Filed: Aug. 31, 1998

Related U.S. Application Data

[60] Provisional application No. 60/058,273, Sep. 8, 1997.
[51] Int. Cl.[7] .......................... B32B 17/06; C03C 17/00; C03C 17/28; C03C 17/30
[52] U.S. Cl. .......................... 428/429; 428/81; 428/428; 428/66.7; 428/34.7; 428/34.6; 428/410; 428/210; 428/447; 427/164; 427/165; 427/167
[58] Field of Search .............................. 428/81, 428, 429, 428/66.7, 34.7, 34.6, 410, 447, 210; 427/108, 164, 165, 167, 168

[56] References Cited

U.S. PATENT DOCUMENTS

| | | |
|---|---|---|
| 3,577,256 | 5/1971 | Benford, Jr. et al. ...................... 117/6 |
| 3,743,491 | 7/1973 | Poole et al. .................................. 65/30 |
| 4,076,863 | 2/1978 | Onoki et al. ............................. 427/165 |
| 4,224,365 | 9/1980 | Ali-Zaidi ................................... 428/35 |
| 4,859,636 | 8/1989 | Arantani et al. ........................... 501/72 |
| 4,891,241 | 1/1990 | Hashimoto et al. ....................... 427/44 |
| 5,476,692 | 12/1995 | Ellis et al. ............................... 427/558 |
| 5,486,693 | 1/1996 | Achter et al. ............................ 250/223 |
| 5,567,235 | 10/1996 | Carson et al. ...................... 106/287.16 |

OTHER PUBLICATIONS

Master Thesis, Alfred University, New York, "Glass Strengthening Via Silane Coupling–Agent Coatings", R. Bennett (Feb., 1989).

*Primary Examiner*—Ellis Robinson
*Assistant Examiner*—Laura L. Lee
*Attorney, Agent, or Firm*—Stanley A. Marcus; Nicholas J. Debenedictis

[57] ABSTRACT

A method is described for strengthening or restoring strength to a flat brittle oxide substrate which includes the steps of coating the edges of the brittle oxide substrate with a strengthening composition without coating a significante portion of the flat surfaces. The strengthen brittle oxide substrate such as glass and a window containing as the window pane the edge strengthen glass are also provided.

13 Claims, 1 Drawing Sheet

STRENGTHENING FLAT GLASS BY EDGE COATING

I hereby claim the benefit of provisional application 60/058,273 which was filed on Sep. 8, 1997.

BACKGROUND OF THE INVENTION

The present invention provides a method of restrengthening flat brittle oxide substrates (e.g. window glass) that has been weakened by surface flaws such as when glass is cut by scoring and breaking. Coatings have been known for repairing surface flaws in glass and thereby restrengthening the glass towards the strength of unflawed glass. Particularly useful strengthening compositions are aqueous solutions containing silane-based compositions especially polymerized cross-linked siloxane. The present invention relates to a method of strengthening or restoring strength to cut flat glass and the resulting restrengthened flat glass article.

Articles made from brittle materials, such as glass window panes, generally have substantially lower tensile strength than predicted. This weakening can be the result of such factors as imperfections in the article, or small amounts of impurities in either the body or the surface of the article. Historically many types of surface treatments of brittle material may be used to protect the surface from abrasion, damage and to provide a small measure of support to brittle articles.

Glass is intrinsically one of the strongest materials known to man. Theoretically, standard silicate glasses should be able to support stresses as high as 14 to 20 gigapascals (2 to 3 million pounds per square inch (psi)). In practice, however, the strengths typically obtained are on the order of 70 megapascals (MPa), about 10,000 psi.

The explanation of the discrepancy between predicted and measured values is the existence of surface flaws or cracks. These flaws essentially fracture the siloxane network (Si—O—Si), which is the backbone of the glass. This damaged point in the glass becomes the focal point of forces on the glass and act to concentrate the force and cause catastrophic failure of the glass article, typically at much lower stresses than otherwise expected.

Researchers have long sought a means to alleviate the problems with glass strength. Many modifications to the forming and handling process of glass articles have led to unsatisfactory increases in the strength because these modified handling procedures still cause some flaws in the glass articles. For this reason, it has been a goal of researchers to reduce the effect of flaws after they are inevitably formed on the object.

Some approaches to improving the strength of glass include Aratani et al., U.S. Pat. No. 4,859,636, wherein metal ions in the glass are exchanged with ions of a larger radius to develop a surface compressive stress. Poole et al., U.S. Pat. No. 3,743,491, also relates to a surface protective treatment. Hashimoto et al., U.S. Pat. No. 4,891,241 relates to strengthening glass surfaces with the application and cure of silane coupling agents in conjunction with acryloyl and methacrylol compounds. The combination is essential.

While the patents described above each provide some improvement to the strength of the glass so treated, they are not without shortcomings. Some of these treatments require longer times than available during manufacturing, necessitating off-line processing. There are also concerns related to worker safety and health. In particular, the use and handling of organic solvents, as well as the acrylate and methacrylate compounds, are a safety and health concern to the manufacturer.

Flat glass is produced commercially by a "float" process, that produces a wide continuous sheet of glass. The flat glass is often cut into more useful sizes. The cutting process introduces flaws into the glass. Cut flat glass pieces are often heat treated to soften and repair such flaws. Heat treatment, or annealing is an expensive process.

Compositions for strengthening of brittle oxide substrates, particularly glass are disclosed in U.S. Pat. No. 5,567,235 by Carson, et al., entitled "A Method of Strengthening a Brittle Oxide Substrate Silane-Based Compositions and a Polymerized Cross-Linked Silane Coated Brittle Oxide Substrate", and U.S. Pat. No. 5,486,693 entitled Method of Strengthening Glass, inventor Bryan Ellis, et al; and in Master Thesis, Alfred University, New York, "Glass Strengthening Via Silane Coupling-Agent Coatings", R. Bennett (February 1989) and in the references cited in the aforementioned references. However, those references do not teach the selective application of the strengthening composition to the edge of flat articles to achieve as good or better strength improvement as applying the strengthening composition to both the edges and the major flat surfaces of the article.

BRIEF SUMMARY OF THE PRESENT INVENTION

The present invention relates to a method of strengthening flat glass pieces by treating essentially only the edges of the glass and not treating most of the large flat surfaces of the glass. First, the one or more edges of the flat glass are coated with a glass strengthening composition (e.g. an aqueous solution containing a silane-based glass strengthening compound) without coating a significant portion of the major flat surfaces, followed by curing to achieve maximum restrengthening. The resulting strength of the edge-coated glass is substantially improved compared to the strength of the glass prior to being coated and surprisingly the edge-treated glass is as strong or stronger than glass having both the edges and the large flat surfaces coated with the identical coating. strengthened, edge-coated flat glass article and a window containing such strengthened glass article as a window pane are also provided.

BRIEF DESCRIPTION OF THE DRAWINGS

The drawings show edge coated, strengthened flat glass and the testing of strengthened flat glass. FIG. 2 is an elevation view of the piece of glass under no load in the testing apparatus while

DETAILED DESCRIPTION OF THE PRESENT INVENTION

Figure 1:
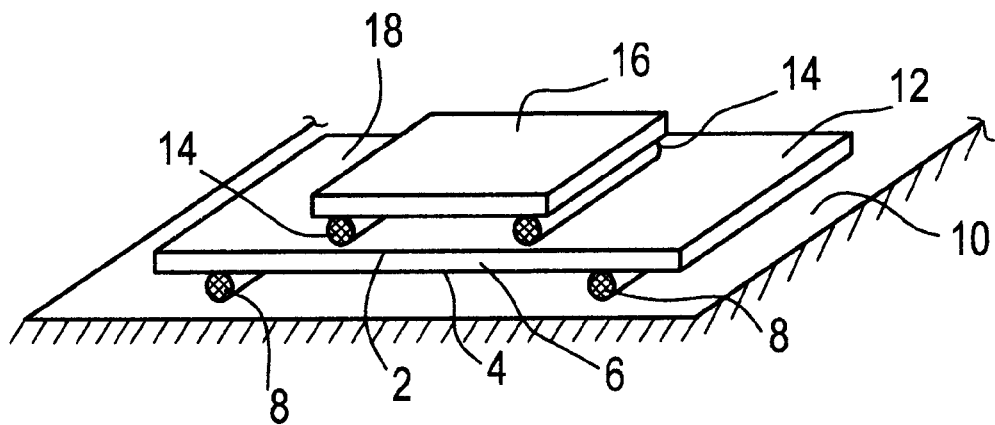
FIG. 1 is a perspective view of flat glass in the testing apparatus.

The invention is described herein primarily in terms of glass as the substrate that is strengthened by edge coating with a glass strengthening composition. However, glass is just one example of a brittle oxide substrate that can be strengthened by the present invention. Flat articles can be made of any brittle oxide material such as aluminum oxides or aluminates, silicon oxides or silicates, titanium oxides or titanates, germinates. Generally planar, or flat pieces of such brittle oxide substrates can be strengthened with the edge treatment of the present invention and are considered equivalent to glass substrates in the practice of the invention. While the invention described herein is explained for glass, this same theory can be applied to any brittle oxide material not demonstrating significant plastic deformation prior to failure. All such brittle oxide materials are considered equivalent substrates for restrengthening by edge coating as disclosed herein. Accordingly the term "glass" as used herein includes all such equivalent brittle oxide substrates. The selection of specific strengthening composition will depend on the composition of the brittle oxide substrate.

The shape of a typical article that can be strengthen by edge treatment according to the present invention is usually flat. However, the essence of the shape of an article whose strength can be improved by the edge treatment of the present invention is a shape that has at least two major surfaces that are generally parallel and at least one minor surface with each major surface connected to at least one minor surface. The minor surface functions as an edge and the ratio of the area of the major surfaces to the area of the minor surface or surfaces is at least 10 and usually greater than 100. Usually, such articles are generally planar or flat such as a window pane. However some shapes having significant curvature posses the essence of the shape of an article whose strength is improved by edge treatment of the present invention. The term "generally parallel" in the above definition does not exclude the absence of curvature for the major surfaces, but only requires that the surfaces be about the same distance apart over most of the article. Accordingly, such generally parallel surfaces need not be flat. An example of a curved article having generally parallel major surfaces as the term is used herein and a minor or edge surface with a major to minor surface area ratio greater than 10 is a cylindrical shape such as a the glass component of a typical tubular fluorescent light bulb. The glass component of a typical incandescent light bulb is another example of a curved shape with inner and outer surfaces being the major surfaces that are about the same distance apart over most of the article (reasonably uniform thickness and therefore generally parallel) and with a minor or edge surface usually in the vicinity of where the glass is connected to the metal screw base. A rectangularly shaped window pane is an example of article having two such major surfaces and four minor surfaces while a circular or elliptical shaped window pane has two such major surfaces and only one minor edge surface.

A generally planar article is depicted in FIG. 1 as item 12. It is typical of a flat article having generally parallel surfaces, i.e. surface 18 and the surface opposite 18, that are an order of magnitude larger than the edge surfaces of the article, (e.g. 6) and the distance between the generally parallel surfaces remains about the same for most of the article. Window glass is the most common brittle oxide article that is generally planar with its major surfaces having an area much greater than the edge area. All that is required is that the article have two generally parallel surfaces significantly larger (e.g. greater than 10 times larger) than the edge surfaces. Curved articles such as curved window panes and automobile windshields or other window glass have large, generally parallel surfaces and are suitable articles for strengthening according to the present invention. Some articles have only one minor or edge surface such as a circular or elliptical window pane or the glass component of an incandescent light bulb, but all have at least two major surfaces with each major surface connected to at least one minor surface.

Glass Strengthening Compositions.

Any composition suitable for strengthening glass by coating glass with the composition is suitable for use in the present invention. Such compositions are capable of restrengthening a brittle oxide article after it has been cut or otherwise damaged or flawed by at least 20% compared to the strength of the cut or flawed article prior to being restrengthen. Such compositions are known to those skilled in the art. Silane based compositions are preferred, especially aqueous based silane compositions. U.S. Pat. No. 5,476,692, Ellis, B., et al. inventors, discloses a mixture for strengthening glass that contains a silane and a resin, which is incorporated herein by reference for its teaching of suitable glass strengthening compositions. Preferred silane based glass strengthening compositions are disclosed in U.S. Pat. No. 5,567,235 issued to Carson, S. et al., which is incorporated herein by reference.

Strengthening compositions other than silane based compositions are also suitable. Solutions containing and aminoplasts such as the reaction product of a compound containing at least two amino groups reacted with a compound containing an aldehyde group and a compound containing a hydroxyl group are suitable for strengthening glass. For example, an aqueous solution of melamine-formaldehyde monomers condensed with methanol can be coated on the edge of flat glass and cured to strengthen the glass such as CYMEL® 385,(~80% methylated melamine-formaldehyde, from Cytec Industries) or Resimene® 717. Additional strengthening chemicals include Vestigon® BF 1530 (ε-caprolactam blocked isopherone di-isocyanate trimer, available from Hüls AG), Jeffamine® T-403 (a polyamine available from Texaco Chemical Co), APS (4-aminophenyl sulfone, available from Aldrich Chemical Co.), Epon® 825 (an epoxy resin available from Shell Chemical Co.). Some are commercially available as dilute solutions that can be applied to the edges and thermally cured to a condensed film. Although some of the commercially available formulations are aqueous, non-aqueous formulations may also be used.

Non-aqueous solutions of blocked isocyanates by themselves or with polyamines or polyols can also be used to strengthen glass by applying them to and thermal curing them on the edges of glass samples. Formulations of epoxies have also been demonstrated. Hashimoto et al, U.S. Pat. No. 4,891,241 also discloses glass strengthening compositions suitable for use in the present invention. The cross linked polyacrylates described in that invention are obtained by both thermal and ultraviolet curing.

Preferred strengthening compositions are silane-based compositions hydrolyzed in the aqueous solution with the hydrolyzed moiety having the following formula:

wherein R" is an organofunctional group which may or may not further hydrolyze in the aqueous solution. This organofunctional group may include residues of hydrolyzable silanes. The selection of R" is further based on the requirement that the resulting aqueous solution containing the hydrolyzed silane-based composition after being coated and cured on the brittle oxide substrate imparts a substantially improved strength to the brittle oxide substrate.

The hydrolyzed silane-based composition, for example, can be selected from the group consisting of methacryloxypropyltrimethoxysilane (MPTMO), glycidoxypropyltrimethoxysilane (GPTMO), vinyltrimethoxysilane (VTMO), 2-(3,4-epoxycyclohexyl)ethyltrimethoxysilane (CETMO), methyltrimethoxysilane (MTMO), 3,3-dimethoxypropyltrimethoxysilane (DPTMO), 5,6-epoxyhexyltrimethoxysilane (EHTMO), N-(trimethoxysilylpropyl)-maleic acid amide, 3-ureidopropyltrimethoxysilane (UPTMO), 1,2-bis (trimethoxysilyl)ethane (BTMOE), 1,2-bis(3-trimethoxysilylpropoxy)ethane (BTMOPE), hydrolyzed forms thereof and mixtures thereof.

Accordingly, preferred examples of the hydrolyzed silane-based compositions include hydrolyzed glycidoxypropyltrimethoxysilane, hydrolyzed 2-(3,4-epoxycyclohexyl)ethyltrimethoxysilane, hydrolyzed 3-ureidopropyl-trimethoxysilane, and hydrolyzed 3,3-dimethoxypropyl-trimethoxysilane.

The coating applied to the brittle oxide substrate can also be a mixture such as a mixture of one or more hydrolyzed silane-based compositions. Generally, the silane-based compositions used in a mixture can be added in any proportion. Further, any of the compositions described herein can be used alone to substantially improve the strength of a brittle oxide substrate.

Unless stated otherwise, the silane-based compositions provided as specific examples are commercially available from one or more of the following sources, OSi Specialties, Dow Corning, Huls America and PCR, Inc.

While the coatings of the present invention can be mixtures of one or more hydrolyzed silane-based compositions, separate coatings of hydrolyzed silane-based compositions can be applied to a surface of a brittle oxide substrate. For example, a coating of CETMO can be applied to a surface of a brittle oxide substrate and then while the CETMO coating is still wet or dry or after curing the first coating, a second coating, another CETMO coating or a different coating (e.g. MPTMO), can also be applied.

Any number of such consecutive separate coatings can be applied in this manner. Further, a surfactant can be applied in this manner, namely, coating a brittle oxide surface with a surfactant before coating the surface with a hydrolyzed silane-based composition(s). Even coatings like that of Hashimoto et al. (U.S. Pat. No. 4,891,241) can be applied after applying the coatings of the present invention.

The silane-based compositions used in the method of the present invention can be present in the aqueous solution at an average concentration from about 1% to about 99% by weight in water or aqueous solution, preferably from about 1% to about 50% and most preferably from about 5% to about 30%.

The following reaction scheme sets forth the two reactions which are believed to occur in the preparation and application of the aqueous solution containing the hydrolyzed silane-based composition.

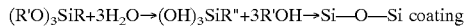
$(R'O)_3SiR + 3H_2O \rightarrow (OH)_3SiR'' + 3R'OH \rightarrow Si-O-Si$ coating In this reaction, the trialkoxy silane reacts in water to form the trisilanol in solution. Then, the trisilanol in solution condenses to form oligomers and may further polymerize to cross-linked siloxane (Si—O—Si) coating upon curing. This siloxane (Si—O—Si) coating generally contains an organic substituent(s) such as the R" group(s).

In this reaction scheme, R'O can be any group that is hydrolyzable. The following R' groups best meet this criteria, —CH₃, —C₂H₅, and

However, other groups which meet this criteria are well known to those skilled in the art.

The R group is an organofunctional group that may hydrolyze during the hydrolysis reaction to form the R" group. This organofunctional group can be a residue of a hydrolyzable silane. Following the hydrolysis reaction and the R group contains hydrolyzable groups, the R" group contains at least one hydroxyl (OH) group. If the R group is not hydrolyzable, then R and R" would be the same, for instance, when R is vinyl or methyl. In general, the R group in the above reaction scheme is preferably selected so that the silane-based compositions of the present invention provide the appropriate balance between improved or restored strength and solution stability. Accordingly, preferred examples of the R group include glycidoxypropyl, 2-(3,4 epoxycyclohexyl)ethyl, and 3,3-dimethoxypropyl. Further, preferred examples of the R" group would be hydrolyzed versions of these preferred R compounds.

The above-described reaction scheme by no means is meant to limit the manner in which the aqueous solution containing the silane-based composition is prepared. Instead of starting with trialkoxy silanes, one can just as easily begin with any hydrolyzable silane. For instance, halide silanes such as substituted trichlorosilanes.

As noted above, upon hydrolysis, the R group can become hydroxyl (OH) containing as the R" group. For example, CETMO and GPTMO which both have an epoxy ring in the R group, upon hydrolysis in the aqueous solution, will result in a dihydroxy group by the opening of the epoxide ring. Thus, the R" group has a balance of hydrophilic (provided by the OH groups) and hydrophobic properties. The hydrophilic properties in the R" group particularly improve the strength.

A surfactant can be added to the strengthening composition to improve coverage of the brittle oxide substrate edge surface which results in a greater strengthening of the brittle oxide substrate. Generally, only a small amount of surfactant is added to allow the coating to spread more efficiently on the brittle oxide substrate. Non-ionic surfactants have been especially useful in this regard. One example of such a surfactant is commercially available Triton X-102 (obtained from Union Carbide) which is octylphenoxy polyethoxy ethanol. Generally, from about 0.001 wt. % to about 1.0 wt. % (based on total weight of solution) of a surfactant can be added. Preferably, from about 0.01 wt. % to about 0.05 wt. % (based on total weight of solution) of a surfactant is added.

For silicon containing brittle oxide substrates other than glass, the silane containing strengthening compositions disclosed above for strengthening glass should be suitable.

Additives to Coating Compositions:

Those skilled in the art will realize that other compounds can be added to the strengthening composition to improve coverage, e.g. the wetting for aqueous solutions, or providing other effects such as U.V. stability, hydrolytic stability or control of rheological properties such as surface lubricity.

For the preferred aqueous silane-based compositions, the pH of the aqueous solution is generally adjusted to the range of about 1.5 to about 11 with the pH usually being adjusted in the preferred range of about 2 to about 4 because the aqueous solutions during testing have shown to be most stable at this pH range. Generally, the pH of the aqueous solutions containing the hydrolyzed silane-based compositions is adjusted based upon the R" group selected. The pH of the aqueous solutions can be adjusted to the desired pH by the addition of a basic or acidic compound.

The aqueous solution containing the hydrolyzed silane-based composition can be affected by aging which can eventually result in a decrease in the amount of strengthening improvement of the brittle oxide substrate. Interestingly, slight aging can, in certain circumstances, be beneficial; for instance the performance of an aqueous GPTMO solution improves with aging e.g. 1 to about 30 days. However, with substantially further aging, e.g. greater than about 100 days, there is an eventual decrease in properties. The shelf life of the aqueous solutions containing the hydrolyzed silane-based compositions is based on a composition by composition basis. For instance, with respect to an aqueous solution wherein the hydrolyzed silane-based composition is hydrolyzed CETMO, a shelf life of at least 100 days is possible without an appreciable effect on the ability to substantially improve the strength of the brittle oxide substrate.

Application of Strengthening Compositions:

The strengthening composition can be coated onto one or more of the edges of the substrate by spraying, dripping, dipping, painting, or any other techniques suited to the application of liquids, vapors, or aerosols. Preferably, the strengthening composition is applied by painting or brushing the edge of the flat substrate.

The coating of the present invention can be applied directly onto any edge surface.

Typically, in the production of windows, suitable sized panes of glass are cut from larger pieces. This cutting is often accomplished by scoring and breaking the larger piece into the desired sizes. A window pane intended for residential purposes may have edges with a thickness in the range of 2 mm to 10 mm and have major or generally parallel flat surfaces from 100 $cm^2$ to more than several square meters. Commercial and industrial window panes are often thicker than residential windows, e.g. more than 10 mm but seldom more than 2 centimeters thick. Regardless of the thickness, the area of the major surfaces are at least 10 and typically several hundred times larger than the area of the edges. The application of the strengthening composition to an edge should be done after that edge has been cut for the shaping or sizing of the glass article. Furthermore, only the edges should be coated with a straight overlap of the coating onto the flat surfaces. The area of the flat surfaces covered with the strengthening composition should be less than 10% of the flat surface area. It is considered equivalent to coating less than 10% of the area of the major surfaces if more than 10% of the area is coated and the coating is removed from at least 90% of the area of the major surfaces before the coating is cured.

The strengthening composition can be applied at temperatures below the softening or annealing temperature of the glass substrate or article. Generally it is applied at or near room temperature. A glass (brittle oxide) surface temperature from about 20 to about 200° C. is preferred, and a surface temperature from about 20 to about 30° C. is most preferred.

Curing of Strengthening Composition:

After the edge to be treated of has been coated with the strengthening composition, for most compositions especially aqueous solutions containing the silane-based compositions, the coating should be cured. Merely drying is adequate for some strengthening compositions. Crosslinking or other reactions may occur during curing. Accelerated curing or drying may be used as in a curing unit, such as a curing oven, to raise the surface temperature of the coated edge. Curing time depends on the chemistry of the strengthening composition and cure temperature. Generally, a curing temperature range of 100–300° C. is used. Preferred is a curing temperature of about 230° C. Certainly, effective curing with surface temperatures lower than 230° C. is possible with certain silane-based coatings such as with BTMOE. Once the curing surface temperature is obtained effective curing occurs quickly. For silane based strengthening compositions, the surface temperature can be held at the at about 230° C. for about 30 seconds. The temperatures used during curing need to be high enough to allow formation of the coating without browning the coating. The temperature range for effective curing is based, in part, on the R'' group selected. For instance, for hydrolyzed CETMO, generally, temperatures below about 200° C. provide marginal results and temperatures above about 350° C. result in the charring of the coating.

The cure step in the method of the present invention can be affected by the application of energy of any source at a magnitude sufficient to remove, e.g., water or other non-coating reaction products from the coating of the treated brittle oxide substrate and to promote any curing reactions associated with the chemistry of the strengthening composition. The curing step, being a combined function of energy and time, can include a low magnitude of energy for a relatively long time, or the opposite, an application of a high magnitude of energy limited as noted hereinabove, for a relatively short period of time. Examples of such energy sources may include microwave, infrared, ultraviolet (UV), irradiation or exposure to ambient or elevated temperatures, such as in an electric or gas heating oven, at, above or below atmospheric pressure, or a combination of such conditions.

Other Coatings:

Additional coatings can be applied on top of the edge strengthening layer to impart additional properties. The preferred cured strengthening composition has some water and humidity resistance. If greater resistance to water than that possessed by the cured strengthening coating is desired, an additional coating or coatings can be applied on top of the strengthening coating or layer. The edge coated with strengthening composition can also be over coated if desired with additional layers to improve impact resistance or to enhance other properties. A top coat for abrasion resistance or to provide impact resistance can be added as a coating on top of the strengthening coating. U.S. Pat. No. 3,743,491, Poole et al. discloses such coatings.

Strength Testing:

Strength, as used herein, refers to the maximum load a specimen can withstand prior to catastrophic failure (and destruction of the article). There are numerous methods for measuring failure strength dependent upon sample geometry and article application. These include bending strength, vertical load, concentric ring strength, and impact testing. The method of the present invention actually strengthens the brittle oxide substrate. As stated in the background, theoretically, all brittle oxide substrates, especially glass, are damaged in some way by minute flaws. Since the brittle oxide substrates theoretically should have a much higher strength, one could characterize the present invention as a method of restoring strength to a brittle oxide substrate since the method of the present invention is providing a degree of strength to the brittle oxide substrate which is closer to its theoretical strength.

As noted, the application of a strengthening composition is to the cut edge of the glass article. The cut edge of a piece of flat glass is an edge along which the glass piece was cut to sever it from a larger piece of glass.

Those skilled in the art will recognize that by increasing the strength of a glass pane or article, a thinner piece of edge coated glass will have substantially equivalent strength and general mechanical performance of a thicker, untreated piece. Thus, the flat glass can be lighter in weight than its untreated counterpart. Furthermore, increasing the strength leads to less failures of the product (e.g., less breakage) during shipping installation and use.

Strengthening Formulations:

The preferred embodiment of the present invention is the use of 5–25 weight % solutions of hydrolyzed trialkoxysilanes such as 2-(3,4-epoxycyclohexyl)ethyl, 3-glycidoxypropyl, and methyl, trialkoxysilanes. The most preferred embodiment of this invention is the use of hydrolyzed 2-(3,4-epoxycyclohexyl)ethyl and methyl trialkoxysilanes to strengthen soda-lime flat glass by coating the cut edges without coating more than 10% of the flat surfaces.

It is possible, in fact, to treat the edges of flat glass and obtain a tensile strength increase of 100% as measured by the 4-point bend test described herein. Among the aqueous silane based strengthening compositions, the strength increase and moisture resistance is greatest for hydrolyzed silane solutions where the fourth moiety has considerable hydrophobic character.

A difficulty encountered when using hydrophobic silanes is the ability to produce a stable aqueous solution. While solutions produced using compounds such as CETMO can be stable for several weeks under proper conditions, it is extremely difficult to produce aqueous solutions with more than a few days of stability using the hydrophobic compounds. This limited shelf life dramatically increases the problems associated with the use of these hydrolyzed materials. This can be overcome as shown in the following examples by the addition of cosolvents such as isopropanol and chelating agents.

A means to remove shelf-life from practical concern is to prepare the hydrolyzed, aqueous solution just prior to its use in the plant. If used in a continuous process, the process would entail a reactor to prepare the hydrolyzed solution, and a holding tank to be used as a feed to the application equipment (typically a spray application). The introduction of the neat materials to the reactor and the subsequent transfer to the feed tank are synchronized such that the material reaching the application equipment is in a state to provide maximum benefit.

The present invention will be further clarified by the following examples. All proportions used in the examples and throughout the specification are by weight unless otherwise stated.

EXAMPLE 1

Figure 2:
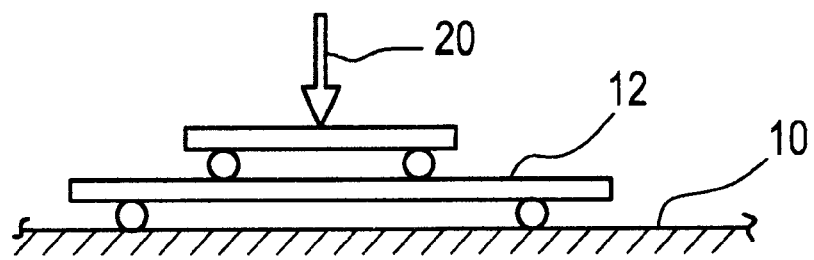
Figure 3:
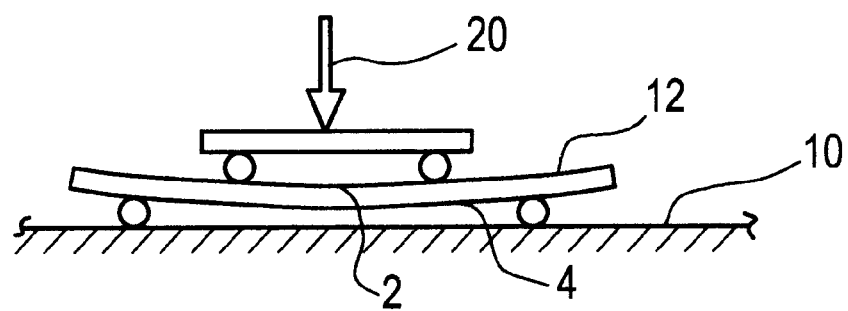
FIG. 3 shows the glass sample bending under load.

An aqueous 15 weight % solution of each strengthening composition to be tested was prepared by the ambient addition of the active ingredient into a dilute acetic acid solution (diluted with deionized water) having a pH of 3.3. Samples of clean soda-lime glass (2"×10½") 2.2 mm thick were used in all the examples with the 10½" edges of each glass sample resulted from cutting the sample from a larger piece of glass by scoring and breaking the glass. The cutting was accomplished by scoring one of the major surfaces 18 shown in FIG. 1 and breaking the glass along the score line. Each sample was cleaned using a commercial glass cleaner, followed by a rinse with isopropanol. The edges were treated by liberally applying the formulation being tested to two thirds of the length each 10½" edge of the sample using a cotton swab applicator. Each formulation was tested immediately (within 1 hour) after preparation and also after various periods of aging measured in days. Replicate samples were prepared and tested. After application with strengthening formulation, the treated samples were heated to a surface temperature of 210–250° C. by placing the sample between two infrared heating panels for 45 seconds at a setting of 600° C. Untreated control samples of glass were subjected to the same heating and cooling as the treated samples but without the application of the aqueous strengthening solution. The samples were cooled to room temperature and the 2"×10½" sample was cut into three 3½"×2" specimens with two specimens having both 3½" edges treated with the formulation and one specimen serving as a control with its edges not treated with the strengthening formulation. The 4-point bend strength was determined for the treated 3½" edges as follows: A 2¼"×1" 4-point bend fixture as shown in FIG. 1 was used. The fixture has a 10,000 lb compression load cell affixed to a load plate (10) on an Instron Testing machine. To test bend strength, a glass specimen (12) is supported on two ¼" steel rods, (8) set 2¼" apart so that the treated edge or minor surface, (6) to be tested spans the 2¼" space between the rods (8), with the major surface 18 that was not scored during cutting but broke along line (2) facing up and the major surface (the surface opposite 18) that was scored along line (4) during cutting facing down. Two ¼" steel rods, (14) are placed on top of the glass specimen, (12) and set 1" apart and parallel with the lower rods (8). A steel plate (16), is placed on top of upper rods (14), and a vertical load (20), e.g. a force, is applied on downwardly on plate (16). FIG. 2 shows the fixture with force (20) at zero, i.e. the "no load" position. FIG. 3 shows the fixture with specimen (12) under load. The load causes glass specimen (12) to bend resulting in the lower major surface (the surface opposite 18) of specimen (12) to be subjected to tensile forces and major surface 18 to be subjected to compressive forces. Load (20) on steel plate (16) is increased at a fixed rate by lowering the cross head (not shown) of the Instron Testing machine at a rate of 0.2" per minute. The machine measures loads up to 10,000 lbs. Typical loads are in the 40–200 lb range.

For each formulation, the strength of replicate samples were tested and the mean value and standard deviation was calculated for the 4-point bend strength of the glass in pounds per square inch (PSI).

The following active glass strengthening compositions were tested in formulations using the above procedure:

3-aminopropyltriethoxysilane (AMEO)

3-aminopropyltrimethoxysilane (APTMO)

vinyltrimethoxysilane (VTMO)

2-(3,4-epoxycyclohexyl) ethyltrimethoxysilane (CETMO)

TABLE I

| Composition | Age | Strength & (Standard Deviation) | % Increase |
|---|---|---|---|
| AMEO (5%) | 6 | 11,300 (2,400) | 26% |
| Untreated | 6 | 8,900 (1,100) | |
| AMEO (5%) | 19 | 9,300 (1,600) | 23% |
| Untreated | 19 | 7,600 (2,000) | |
| AMEO (15%) | 5 | 15,800 (4,400) | 109% |
| Untreated | 5 | 7,600 (2,000) | |
| APTMO (5%) | ⅓* | 10,000 (1,900) | 14% |
| Untreated | ⅓* | 8,800 (1,000) | |
| APTMO (5%) | 1 | 10,800 (1,500) | 39% |
| Untreated | 1 | 7,700 (200) | |
| APTMO (5%) | 7 | 11,700 (1,500) | 33% |
| Untreated | 7 | 8,800 (1,700) | |
| VTMO[1] (5%) | ¼* | 11,000 (3,000) | 20% |
| Untreated[1] | ¼* | 9,200 (200) | |
| VTMO[1] (5%) | ¾* | 12,400 (2,000) | 33% |
| Untreated[1] | ¾* | 9,300 (1,000) | |
| VTMO[1] (5%) | 1 | 11,100 (1,200) | 45% |
| Untreated[1] | 1 | 7,700 (1,300) | |
| VTMO[2] (5%) | 1 | 13,100 (3,200) | 57% |
| Untreated[2] | 1 | 8,400 (300) | |
| VTMO[2] (5%) | 3 | 8,100 (1,500) | 34% |
| Untreated[2] | 3 | 6,000 (200) | |
| CETMO[3] (15%) | 7 | 15,500 (1,400) | 93% |
| Untreated[3] | 7 | 8,000 (500) | |

*Time in Hours
[1]heated for 25 seconds
[2]heated for 45 seconds
[3]heated for 60 seconds
[4]Formulation had some precipitate present- phase separation Comparison of Total Coating vs Edge Only Coating:

The effect on 4-point bend strengthening by treating the entire specimen versus the treatment of the edge only was studied using two concentrations (5 & 15 weight %) of aqueous CETMO [2-(3,4-epoxycyclohexyl)ethyltrimethoxy-silane], 15 weight % MTMO (methyltrimethoxysilane) and 15 weight % VTMO (vinyltrimethoxysilane). Examples 2, 3, and 4 show that treating only the edge is as good if not better then treating all the surfaces of the glass sample including all the large surfaces and the edges. This is suprising and unobvious result to obtain equal or better strength with less than 20% of the total surface area covered with cured strengthening composition verses covering all the surface area of the article.

EXAMPLE 2

The 3½"×2" soda-lime glass specimens were precut from a larger sheet of glass and cleaned by washing with a Windex® solution and wiping them with standard laboratory paper towels; followed by washing with isopropanol and allowing the samples to dry in air. The samples were then wiped with Kimwipe® paper tissue just prior to treatment.

The 5 weight % aqueous CETMO formulation used here was prepared by diluting 10 grams of a 30 weight % aqueous CETMO formulation to a total of 60 grams with additional pH 3.3 aqueous acetic acid. One half of the samples were totally immersed at room temperature for 2 minutes in a 5 weight % aqueous CETMO formulation in a clean Pyrex dish, removed using metal tongs, and the excess allowed to drip off. The samples were thermally cured between two infrared heating panels for 1 minute at a panel setting of 600° C. The substrate surface temperature was in the 230–280° C. range. The other half of the samples had the 5 weight % aqueous CETMO formulation applied to the edges only using a cotton swab applicator. These samples were also thermally cured for 1 minute between the infrared heating panels. The 4-point bend strengths of the samples were tested as described in Example 1.

| 5 WEIGHT % CETMO 4-POINT BEND STRENGTHS | |
| --- | --- |
| Sample Treatment | 4-Point Bend Strength psi (S.D.)[1] |
| Edge Only | 12,500 (200) |
| Full Immersion | 11,000 (200) |
| Untreated Controls | 6,000 (200) |

[1]S.D. = (n-1) standard deviation

EXAMPLE 3

The 3½"×2" soda-lime glass specimens were prepared as described in Example 2. The 15 weight % aqueous CETMO formulation was prepared by the addition 7.5 grams of CETMO (Lot # 36IJ022996 from OSi Specialties) to 42.5 grams of pH 3.3 aqueous acetic acid. Half of the samples were immersed in the 29 day old 15 weight % aqueous CETMO for 2 minutes, removed as described in Example 2 and thermally cured as described in that example. The other half of the samples were treated on the edges only with the solution applied using the cotton swab applicator and also thermally cured as described above. The following table shows the 4-point bend strengths of the samples tested.

| 15 WEIGHT % CETMO 4-POINT BEND STRENGTHS | |
| --- | --- |
| Sample Treatment | 4-Point Bend Strength psi (S.D.)[1] |
| full immersion | 12,700 (1,400) |
| edge only | 13,800 (1,400) |
| untreated controls | 6,300 (200) |

[1]S.D. = (n-1) standard deviation

EXAMPLE 4

The 3½"×2" soda-lime glass specimens were prepared as described in Example 2. A 15 weight % aqueous MTMO formulation was prepared by the addition 7.5 grams of MTMO (Lot # 95E-8025 from Gelest, Inc. to 42.5 grams of pH 3.3 aqueous acetic acid at ambient temperature. The formulation was mechanically shaken for 15 minutes. A small amount, 0.03 grams of Silwet L-7604 (OSi Specialties), was added to improve the spreading of the formulation. The solution phase separates in 48–72 hours at ambient temperature. Half of the samples were immersed in the 15 weight % aqueous MTMO for 2 minutes, removed as described in Example 2 and thermally cured for 50 seconds between the infrared heating panels. The other half of the samples were treated on the edges only with the formulation applied using the cotton swab applicator and also thermally cured as described above. The substrate surface temperature was in the 180–230° C. range. The formulation ages are shown in the following table. The following table also shows the 4-point bend strengths of the samples tested.

| 15 WEIGHT % MTMO 4-POINT BEND STRENGTHS | | |
| --- | --- | --- |
| Formulation Age hours | Sample Treatment | 4-Point Bend Strength psi (S.D.)[1] |
| 3 | full immersion | 8,400 (1,600) |
| 3 | edge only | 9,200 (3,900) |
| untreated controls | | 6,300 (1,300) |
| 22 | full immersion | 9,200 (2,200) |
| 22 | edge only | 12,600 (4,700) |
| untreated controls | | 5,300 (300) |

[1]S.D. = (n-1) standard deviation

EXAMPLE 5

The 3½"×2" soda-lime glass specimens were prepared as described in Example 2. A 15 weight % aqueous VTMO formulation was prepared by the addition 7.5 grams of VTMO (Lot # 81246 from Hüls Petrarch Systems). to 42.5 grams of pH 3.3 aqueous acetic acid at ambient temperature. The formulation was mechanically shaken for 15 minutes. A small amount, 0.03 grams of Silwet L-7604 (OSi Specialties, was added to improve the spreading of the formulation. The formulation phase separates within 24 hours at ambient temperature. Half of the samples were immersed in the 15 weight % aqueous VTMO for 2 minutes, removed as described in Example 4 and thermally cured for 50 seconds between the infrared heating panels. The other half of the samples were treated on the edges only with the formulation applied using the cotton swab applicator and also thermally cured as described above. The formulation age is shown in the following table. The following table also shows the 4-point bend strengths of the samples tested.

15 WEIGHT % VTMO 4-POINT BEND STRENGTHS

| Formulation Age hours | Sample Treatment | 4-Point Bend Strength psi (S.D.)[1] |
|---|---|---|
| 5 | full immersion | 8,400 (1,000) |
| 5 | edge only | 9,500 (1,400) |
| untreated controls | | 6,300 (1,300) |

[1]S.D. = (n-1) standard deviation

Non-Aqueous Formulations For Edge Strengthening

The following examples demonstrate the strengthening effect of hydrolyzed trialkoxysilanes. The solution stability of certain alkyltrialkoxysilanes is improved by the addition of non-aqueous solvents and chelating agents. (MTMO/TFPTMO/Isopropanol formulations were examined.)

The following reagents were added under ambient conditions to a glass container equipped with a plastic lined screw cap; 3.9 grams of reagent grade isopropanol (Lot # 3032KTRP, Mallinckrodt), 0.75 grams MTMO (methyltrimethoxysilane Lot # 95E-0825, Gelest, Inc.), 0.02 grams of TFPTMO (3,3,3-trifluorpropyltrimethoxysilane, Lot # 120,337 United Chemical Technologies) and 0.35 g of 1 N aqueous hydrochloric acid. The formulation was mechanically shaken for 15 minutes at ambient temperature. (The formulation is stable for 2 days before phase separation begins.) The formulation was liberally applied to two thirds of the length of the scribed edges of a clean 2.2 mm thick soda-lime glass (2"×10½") sample using a cotton swab applicator at the formulation ages shown in the table below. The samples were thermally treated for 30 seconds at an infrared panel setting of 600° C. The surface temperature was in the 150–200° C. range. The samples were cooled, cut, and their 4-point bend strengths measured as described in example 1. The following table shows the results.

15/0.25 WEIGHT % MTMO/TFPTMO in Isopropanol

4-POINT BEND STRENGTHS

| Formulation Age hours | 4-Point Bend Strength psi(S.D.)[1] | Comments |
|---|---|---|
| ½ | 11,300 (3,000) | Formulation clear and homogeneous |
| 5 | 12,300 (2,700) | Same as above |
| 24 | 13,600 (1,100) | Formulation slightly hazy |
| untreated controls | 7,700 (600) | |

[1]S.D. = (n-1) standard deviation

EXAMPLE 6

The following reagents were added under ambient conditions to a glass container equipped with a plastic lined screw cap; 3.5 grams of reagent grade isopropanol (Lot # 3032KTRP, Mallinckrodt), 1.0 grams MTMO (methyltrimethoxysilane Lot # 95E-0825, Gelest, Inc.), 0.03 grams of TFPTMO (3,3,3-trifluorpropyltri methoxysilane, Lot # 120,337 United Chemical Technologies) and 0.7 g of pH 3.2 aqueous acetic acid The formulation was mechanically shaken for 15 minutes at ambient temperature. The formulation has greatly improved stability compared to the one described in example 5. The formulation was liberally applied to two thirds of the length of the edges of a clean 2.2 mm thick soda-lime glass (2"×10½") sample using a cotton swab applicator at the formulation ages shown in the table below. The samples were thermally treated for 40 seconds at an infrared panel setting of 600° C. The surface temperature was in the 170–210° C. range. The samples were cooled, cut, and their 4-point bend strengths measured as described in example 1. The following table shows the results.

15/0.25 WEIGHT % MTMO/TFPTMO in Isopropanol

4-POINT BEND STRENGTHS

| Formulation Age days | 4-Point Bend Strength psi (S.D.)[1] | Comments |
|---|---|---|
| 7 | 10,600 (1,100) | Formulation clear and homogeneous |
| 31 | 12,900 (2,000) | Same as above |
| untreated controls | 8,400 (1,000) | |

[1]S.D. = (n-1) standard deviation

EXAMPLE 7

The following reagents were added under ambient conditions to a glass container equipped with a plastic lined screw cap; 3.5 grams of reagent grade isopropanol (Lot # 3032KTRP, Mallinckrodt), 1.0 grams MTMO (methyltrimethoxysilane Lot # 95E-0825, Gelest, Inc.), 0.03 grams of TFPTMO (3,3,3-trifluorpropyltrimethoxysilane, Lot # 120,337 United Chemical Technologies) and 0.5 g of 1N aqueous hydrochloric acid, and 0.02 of $Ni(AcAc)_2$ (nickel acetylacetonate, Lot #206 from ROC/RIC Research Corp) as a stabilizer. The formulation was mechanically shaken for 15 minutes at ambient temperature. The formulation has greatly improved stability compared to the one described in example 5. The formulation was liberally applied to two thirds of the length of the edges of a clean 2.2 mm thick soda-lime glass (2"×10½") sample using a cotton swab applicator at the formulation ages shown in the table below. The samples were thermally treated for 40 seconds at an infrared panel setting of 600° C. The surface temperature was in the 170–210° C. range. The samples were cooled, cut, and their 4-point bend strengths measured as described in example 1. The following table shows the results.

15/0.25 WEIGHT % MTMO/TFPTMO in Isopropanol 4-POINT BEND STRENGTHS

| Formulation Age days | 4-Point Bend Strength psi (S.D.)[1] | Comments |
|---|---|---|
| 4 | 9,800 (1,600) | Formulation clear and homogeneous |
| 31 | 13,300 (3,300) | Same as above |
| untreated controls | 8,500 (1,100) | |

[1]S.D. = (n-1) standard deviation

EXAMPLE 8

The following reagents were added under ambient conditions to a glass container equipped with a plastic lined screw cap; 0.8 grams of deionized water, 0.4 grams of reagent grade acetone, and 2.0 grams of Cymel® 385 (~80% methylated melamine-formaldehyde, Lot # 11464 from Cytec Industries). The 50 weight % formulation was liberally applied to the edges of two thirds of the length of a clean 2.2 mm (0.09") thick soda lime glass (2"×10½") sample using a cotton swab applicator. The samples were thermally treated for 30 seconds at an infrared panel setting of 600° C.

The surface temperature was in the 150–200° C. range. The samples were cooled to ambient temperature, cut into the 2"×3½" test samples and their 4-point bend strengths determined. The treated samples exhibited a mean 4-point bend strength of 13,000 psi with a standard deviation of 2700 psi. The untreated, thermally cured samples exhibited a mean 4-point bend strength of 6,000 psi with a standard deviation of 600 psi.

EXAMPLE 9

The following reagents were added under ambient conditions to a glass container equipped with a plastic lined screw cap; 0.8 grams of reagent grade acetone, 0.4 grams of Vestigon® BF 1530 ε-caprolactam blocked isopherone di-isocyanate trimer (Hüls AG), and 0.25 grams Jeffamine® T-403 polyamine (Texaco Chemical Co). The resulting 28/17 weight % BF1530/T-403 formulation was liberally applied to the edges of two thirds of the length of a clean 2.2 mm (0.09") thick soda lime glass (2"×10½") sample using a cotton swab applicator. The samples were thermally treated for 60 seconds at an infrared panel setting of 600° C. The surface temperature was in the 200–270° C. range. The samples were cooled to ambient temperature, cut into the 2"×3½" test samples and their 4-point bend strengths determined. The treated samples exhibited a mean 4-point bend strength of 14,400 psi with a standard deviation of 1800 psi. The untreated, thermally cured samples exhibited a mean 4-point bend strength of 7,700 psi with a standard deviation of 400 psi.

EXAMPLE 10

The following reagents were added under ambient conditions to a glass container equipped with a plastic lined screw cap; 0.8 grams of reagent grade acetone, 0.4 grams of Vestigon® BF 1300 internally blocked isopherone di-isocyanate oligomer (Hüls AG), and 0.2 grams APS (4-aminophenyl sulfone, Aldrich Chemical Co.) The resulting 29/14 weight % BF1300/APS formulation was liberally applied to the edges of two thirds of the length of a clean 2.2 mm (0.09") thick soda lime glass (2"×10½") sample using a cotton swab applicator. The samples were thermally treated for 60 seconds at an infrared panel setting of 600° C. The surface temperature was in the 200–270° C. range. The samples were cooled to ambient temperature, cut into the 2"×3½" test samples and their 4-point bend strengths determined. The treated samples exhibited a mean 4-point bend strength of 13,100 psi with a standard deviation of 600 psi. The untreated, thermally cured samples exhibited a mean 4-point bend strength of 6,000 psi with a standard deviation of 300 psi.

EXAMPLE 11

The following reagents were added under ambient conditions to a glass container equipped with a plastic lined screw cap; 4.0 grams of reagent grade acetone, 2.0 grams of Vestigona® BF 1300 internally blocked isopherone di-isocyanate oligomer (Hüls AG). The resulting 33 weight % BF1300 formulation was liberally applied to the edges of two thirds of the length of a clean 2.2 mm (0.09") thick soda lime glass (2"×10½") sample using a cotton swab applicator. The samples were thermally treated for 60 seconds at an infrared panel setting of 600° C. The surface temperature was in the 200–270° C. range. The samples were cooled to ambient temperature, cut into the 2"×3½" test samples and their 4-point bend strengths determined. The treated samples exhibited a mean 4-point bend strength of 15,300 psi with a standard deviation of 300 psi. The untreated, thermally cured samples exhibited a mean 4-point bend strength of 7,000 psi with a standard deviation of 800 psi.

EXAMPLE 12

The following reagents were added under ambient conditions to a glass container equipped with a plastic lined screw cap; 4.0 grams of reagent grade acetone, 2.0 grams of APS (4-aminophenyl sulfone, Aldrich Chemical Co.), 3.0 Epon® 825 epoxy resin (Shell Chemical Co.), 3.0 grams of GPTMO (3-glycidoxypropyltri-methoxysilane, Hüls Petrarch Systems, Inc.). The resulting 25/25/16 weight % Epon ® 825/GPTMO/APS formulation was liberally applied to the edges of two thirds of the length of a clean 2.2 mm (0.09") thick soda lime glass (2"×10½") sample using a cotton swab applicator. The samples were thermally treated for 60 seconds at an infrared panel setting of 600° C. The surface temperature was in the 200–270° C. range. The samples were cooled to ambient temperature, cut into the 2"×3½" test samples and their 4-point bend strengths determined. The treated samples exhibited a mean 4-point bend strength of 17,000 psi with a standard deviation of 2000 psi. The untreated, thermally cured samples exhibited a mean 4-point bend strength of 7,000 psi with a standard deviation of 1000 psi.

What is claimed:

1. An improved brittle oxide article wherein said article is shaped to have at least two generally parallel major surfaces and at least one minor edge surface, has a ratio of the area of the major surfaces to the area of the minor surface of at least 10, and each major surface is connected to at least one minor edge surface, wherein said improvement comprises at least one minor edge surface being coated with a strengthening composition for the brittle oxide and at least 90% of the area of the major surfaces of the article being essentially free of any strengthening composition.

2. The article of claim 1, wherein the brittle oxide article is a rectangular shaped piece of glass having two major surfaces and four minor edge surfaces.

3. The article of claim 1, wherein the brittle oxide article is a circular or elliptical shaped piece of glass having two major surfaces and one minor edge surface.

4. The article of claim 1 wherein said brittle oxide article is a generally tubular shaped piece of glass having two major surfaces and two minor edge surfaces.

5. The article of claim 1 wherein said brittle oxide article is a bulb shaped piece of glass having two major surfaces and one minor edge surface.

6. The article of claim 1 wherein said brittle oxide article is a glass article having curves in its major surfaces and shaped for use as window glass in an automobile.

7. The article of claim 1 further comprising a second coating on top of the strengthening composition.

8. The article of claim 7 wherein said second coating is water insoluble and provides a water resistance barrier to said cured strengthening coating.

9. The article of claim 7 wherein said second coating is flexible and provides impact resistance to the article.

10. A silane coated brittle oxide article having generally parallel major surfaces and at least one minor edge surface, a ratio of the area of the major surfaces to the area of the minor surface of at least 10 and each major surface connected to at least one minor surface and having a strengthening layer of polymerized cross-linked siloxane cured onto at least one edge of the brittle oxide substrate, with at least 90% of the major surfaces being free of any strengthening layer, the polymerized cross-linked siloxane being formed from an aqueous silane-based composition substantially lacking an organic solvent and the silane being selected from the group consisting of MPTMO, GPTMO, VTMO, CETMO, MTMO, DMPTMO, 3-ureidopropyl-trimethoxysilane, 1,2-bis(trimethoxysilyl)ethane, 1,2-bis(3-trimethoxysilylpropoxy) ethane, 5,6-epoxyhexyltrimethoxy-silane, N-(trimethoxysilylpropyl) maleic acid amide, hydrolyzed forms thereof and mixtures thereof.

11. The article of claim 10, wherein the substrate is glass.

12. In a window having a frame and at least one window pane mounted in said frame, the improvement comprising having as the window pane, the article of claim 1.

13. In a window having a frame and at least one window pane mounted in said frame, the improvement comprising having as the window pane, the strengthen glass article of claim 11.

* * * * *